Nov. 7, 1950          E. THYS          2,529,319

ARC FURNACE TILTING AND ADJUSTING MECHANISM

Filed May 18, 1946          3 Sheets-Sheet 1

INVENTOR
Edouard Thys
BY
ATTORNEYS

Nov. 7, 1950 E. THYS 2,529,319
ARC FURNACE TILTING AND ADJUSTING MECHANISM
Filed May 18, 1946 3 Sheets-Sheet 2

INVENTOR
Edouard Thys
BY
ATTORNEYS

INVENTOR
Edouard Thys

Patented Nov. 7, 1950

2,529,319

UNITED STATES PATENT OFFICE 2,529,319

ARC FURNACE TILTING AND ADJUSTING MECHANISM

Edouard Thys, Sacramento, Calif.

Application May 18, 1946, Serial No. 670,674

8 Claims. (Cl. 13—10)

1

This invention relates to electric arc furnaces for reduction of metals, and is particularly directed to an improved roof construction and control means therefor, and a novel means for tilting the furnace shell for tapping.

One object of the invention is to provide a combination support for the roof of the furnace and the electrode holders so arranged that when the furnace is in operation the roof is capable of being positioned accurately in place with the electrodes likewise held accurately in place with respect to the roof.

A further object of the invention is to provide a means for simultaneously lifting the roof from the shell of the furnace and then, as a continuing operation, swinging both the roof and the electrode holders as a unit clear of the furnace shell.

Another object of the invention is to provide a means whereby the same instrumentality which is operative to lift and swing the roof may also be utilized to tip the furnace for tapping.

A still further object is to provide a means whereby the roof may be lifted clear of the assembly for relining or the like without the necessity of disassembling any of the operating parts.

These objects are accomplished by means of the structure and relative arrangement of parts described in detail in the following specification and defined in the appended claims.

2

Referring now more particularly to the characters of reference on the drawings, the numeral 1 designates the furnace shell which is mounted upon a suitable foundation or supporting base 28, and provided with all the necessary accessories to provide for charging and tapping the same, as is usual.

Figure 2:
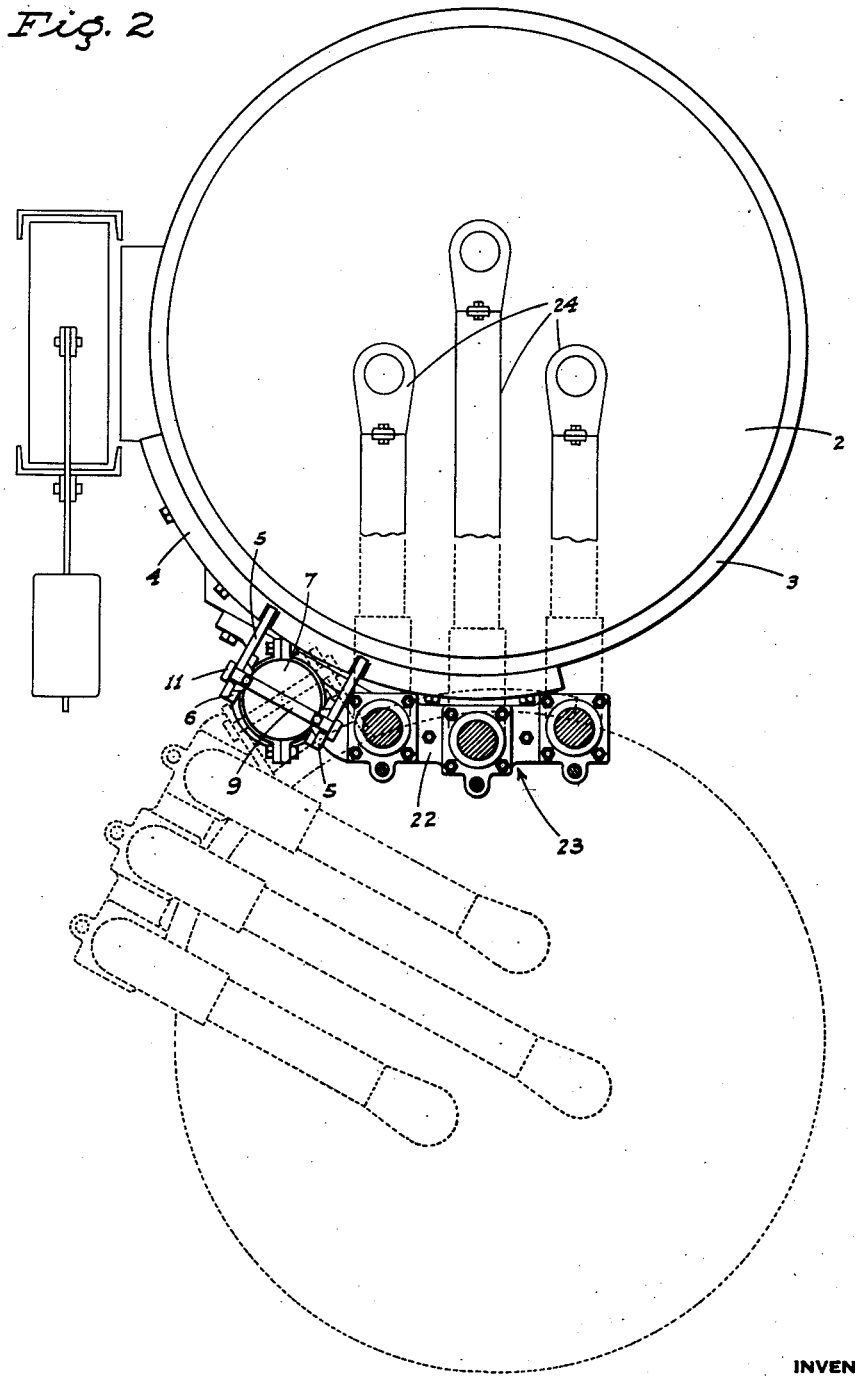
Fig. 2 is a top plan view of the furnace with the roof in position on the shell and partly broken away and in section, and showing the open position of the roof and electrodes by dotted lines.
Figure 3:
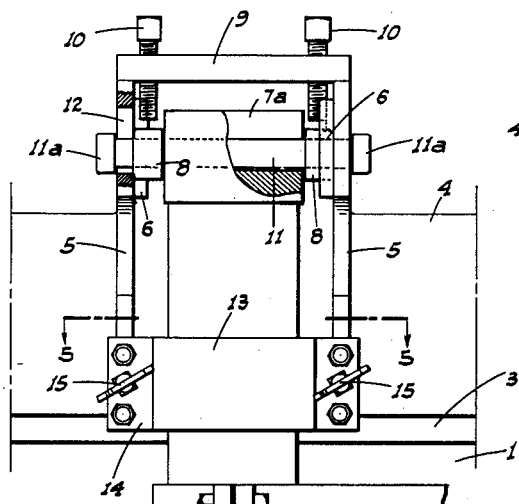
Fig. 3 is a fragmentary side elevation partly in section of the lifting piston and its manner of connection with the roof.
Figure 4:
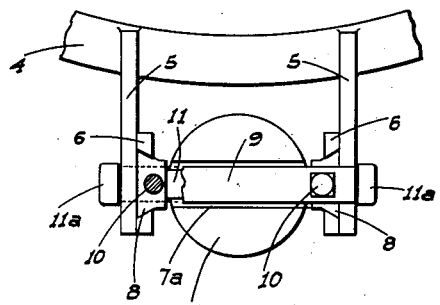
Fig. 4 is a top plan view, partly in section, of the adjusting slide mechanism between the lifting piston and the roof brackets.
Figure 5:
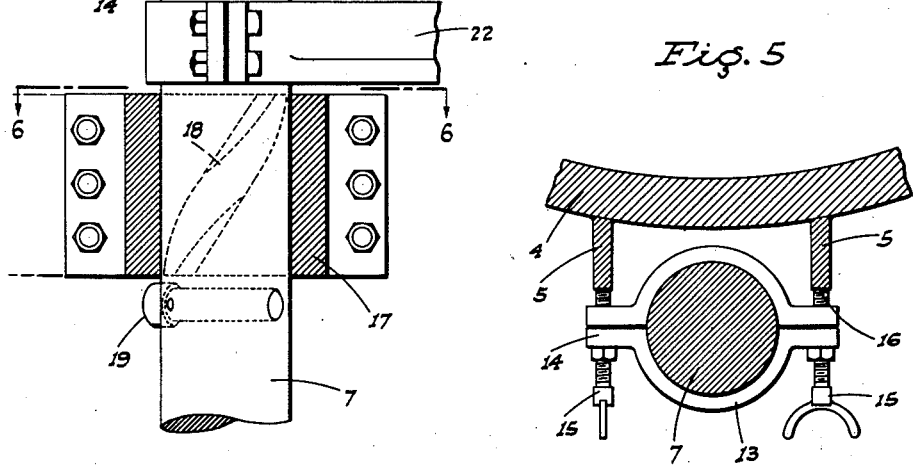
Fig. 5 is a fragmentary sectional view taken on a line 5—5 of Fig. 3.
Figure 6:
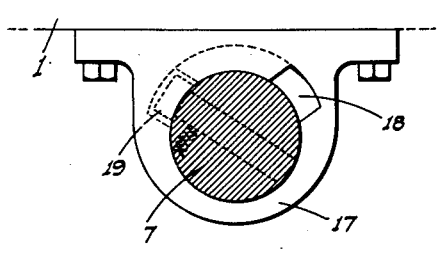
Fig. 6 is a fragmentary sectional view taken on a line 6—6 of Fig. 3.

Numeral 2 designates the roof which is removably mounted on the upper open side of the shell, and the present invention embodies, among other features, a new and novel means for lifting this roof and turning it clear of the shell in the manner shown by dotted lines in Fig. 2, and at the same time carrying the electrode holders likewise away from their position overhanging the shell simultaneously with the turning of the roof.

The roof includes an encircling band 3. Secured to this band is an arcuate supporting strap 4. Fixed rigidly to the strap 4 are a pair of outwardly projecting roof brackets 5 provided with vertically disposed slots 12. Straddling each slot is a female dove-tail slide guide 6. Slidable in each such guide is a male dove tail slide 8. These slides are connected by a cross pin 11 which projects through the slots 12 for vertical movement therein and are retained in position therein by collars 11a, one at each end thereof. Across the top of the brackets 5 is a bar 9. At opposite ends of this bar are set screws 10 which are positioned to bear against the slides 8 to check the upward movement of the pin 11 in slots 12 at any selected position determined by the setting of the screws 10.

Numeral 7 designates the lift piston. At its upper end this piston is provided with a fork 7a which straddles the pin 11. With an upward movement of the piston the bottom of the fork engages the pin which through the medium of slides 8 and set screws 10 lifts the roof. The setting of the pin 11 is such that when the piston moves downward the bottom of the fork recedes with the pin which then clears the set screws leaving the roof free to seat freely on the furnace shell without binding on the piston head.

When the roof is to be removed from the shell for relining or the like, it, and its connected brackets, may be lifted by a crane clear of the fork on the piston without the necessity of disassembling any of the parts of the mechanism described herein.

A collar 13 is securely clamped on the piston 7, and has diametrically opposed projecting flanges 14. Adjustment screws 15 project through the flanges 14 and abut against shoulders 16 on the lower ends of the brackets 5 whereby to provide an adjustable thrust connection between the piston 7 and the roof when the piston turns. These screws 15 may be adjusted to level the roof.

Secured to the side of the shell 1 below and in substantial alinement with the above described assembly are a pair of spaced bearings 17, through which the piston 7 is mounted for both longitudinal and turning movement therethrough. At least one of these bearings 17, and preferably both of them, is provided on its inner surface with a helical slot 18. Secured to the piston 7 at a point just below the bearing 17 when the roof 2 is in position on the shell 1 is a lug 19, which is operable to engage the slot 18 and rotate the piston 7 concurrently with any longitudinal movement of the piston through the bearing. It will therefore be obvious that upon upward movement of the piston the roof through the medium of the connection between the piston 7, pin 11, and the brackets 5 will first be lifted so as to clear the top of the shell 1. With continued upward movement of the piston, the lug 9 will engage the helical slot 18 and following such slot will cause the piston 7 to turn and completely swing the roof from the position shown in full lines in Fig. 2 to the position shown by the dotted lines in said figure. The upward sliding movement of the piston 7 may be accomplished by any suitable mechanical means, but is preferably carried out in my disclosure by a hydraulically operated rod 20 propelled through the instrumentality of a hydraulic cylinder 21.

Securely clamped to the piston 7 is a pair of projecting bracket arms 22, and mounted rigidly to these arms are the electrode holder operating cylinders 23. Since this electrode holder assembly is thus rigidly tied to the piston 7 it will be obvious that with the lifting and turning of such piston 7 the electrode holders and operating means therefore will be first lifted and then turned clear of the shell 2 simultaneously with the turning of the roof so that the electrode holders 24 will follow with the roof to the position shown by dotted lines in Fig. 2.

A lowering of the piston 7 will reverse the operation described above. The lug 19 will travel down the spiral slot 18 in a reverse direction and completely swing the roof back over the shell 1 simultaneously with the lowering thereof. The lug will then leave the slot and continued downward movement of the piston will lower the roof into its proper position on the shell. The various adjustments described and the fact that the piston head recedes from the pin 11 as the roof comes to rest on the furnace shell prevents any binding between the roof and lift piston.

In addition to its function in lifting and turning the roof the piston 7 may likewise be utilized to tip the furnace for tapping. To this end there is provided the following described structure.

Figure 1:
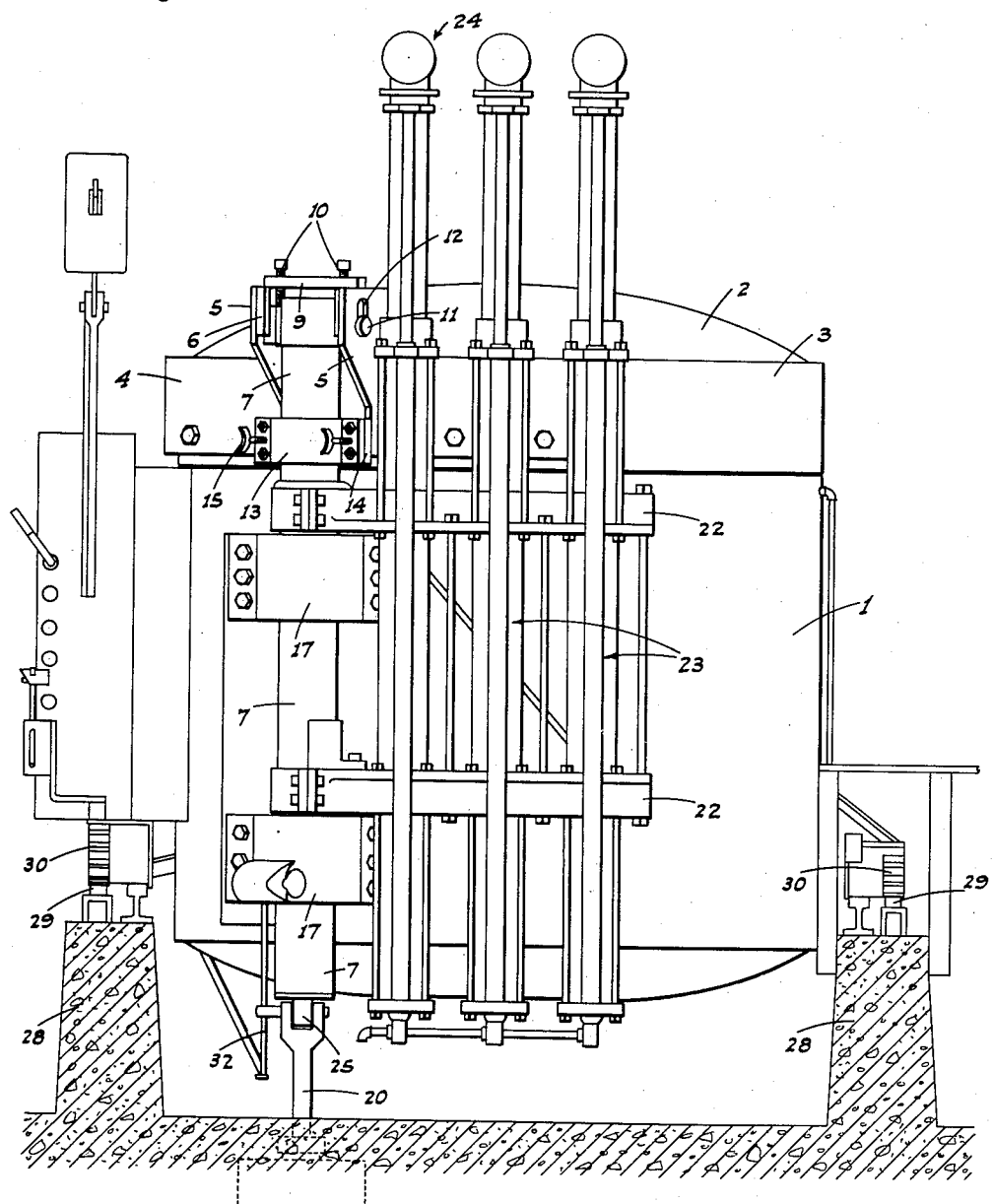
Fig. 1 is a side elevation of the complete furnace showing the position of the furnace roof and electrode holders when the roof is in position on the furnace shell.
Figure 8:
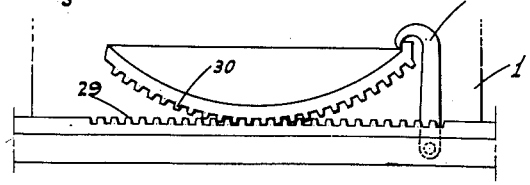
Fig. 8 is a side elevation of the furnace shell showing a hook means for holding the furnace shell upright when the roof is to be raised and turned.
Figure 7:
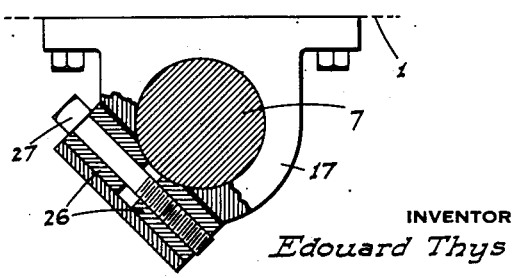
Fig. 7 is a transverse section through one of the piston bearings showing a means for clamping the piston to the bearing when the furnace shell is to be tipped for tapping.

The piston 7 is hinged to the rod 20 as at 25. See Fig. 1. In one of the bearings 17, preferably the lower one, are disposed a pair of oppositely movable clamping jaws 26 operable by a threaded bolt 27 to clamp the piston 7 rigidly to the bearing and thus prevent its reciprocating movement through the bearing. See Fig. 7. On each side of the furnace shell 1 is a supporting base 28 on which is a gear track 29 into which meshes an arcuate roller gear track 30 fixed to the furnace shell whereby the shell may be tipped forwardly for tapping. See Fig. 8. On one end of each track 29 is pivoted a hook 31 each engageable with one end of the corresponding track 30 to lock the shell against tipping movement. One hook engages the end of the corresponding track opposite the end of the other track engaged by the other hook so that the shell is held from tipping in either direction.

When the piston is to be operated to lift and swing the roof the hooks 31 are engaged with the tracks 30 to hold the shell upright against any tilting movement and the bolt 27 is turned in a direction to free the clamps 26 from the piston. Reciprocating movement of the piston may then be had to lift and turn the roof while the shell is held immobile.

When the piston is to be operated to tilt the shell the hooks 31 are disengaged from the tracks 30 and the clamps 26 are then tightened against the piston 7 locking it to the bearing 17 and hence against vertical movement. Pressure of rod 20 then causes a hinge action at the hinge joint 25 and effects a tilting of the shell 1 moving about the axis of the gear tracks 30. A guide rod 32 fixed to the furnace projects through a bracket on the rod 20 and holds the latter from turning during its movements so that there is no binding of the parts at the hinge joint.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful and upon which Letters Patents is desired:

1. A furnace including a furnace shell mounted for selective tilting movement, a roof on the shell, a piston mounted on the shell for reciprocating and turning movement, means connecting the piston with the roof for lifting and turning the roof with an upward and turning movement of the piston, respectively, releasable means for holding the shell from tipping during such movement of the piston, means for clamping the piston to the shell to prevent reciprocating movement of such piston relative to the shell, a vertically moving push rod in axial alinement with the piston, and a hinged connection between the push rod and the piston.

2. The combination with a furnace shell of a roof removably seating on the shell, a pin supported outwardly from the periphery of the roof, a vertically disposed piston rod journaled adjacent the side of the shell for vertical reciprocation and turning movement relative to the shell, an upwardly opening fork on the upper end of the piston, means to selectively move the piston upwardly to straddle the fork over the pin and lift the roof or to move the piston downwardly to lower the fork clear of the pin, means interposed between the piston and the roof effective to maintain the roof in a plane substantially at right angles to the axis of the piston during the lifting and lowering movements of the roof and an electrode rod holding and operating assembly supported on the piston, the electrode holding arms thereof normally overhanging the roof, said operating assembly being turnable with the piston whereby when the latter is clear of the pin the overhanging arms may be swung clear of the roof leaving the latter free to be lifted from the shell without disturbance of the piston and electrode assembly.

3. The combination with a furnace shell, of a roof removably seated on said shell, a pair of spaced brackets fixed to the periphery of the roof and projecting laterally out therefrom, said brackets being provided with alined substantially vertical slots, a pin mounted for movement in said slots and projecting between the brackets, a piston separate from the roof and mounted adjacent the shell for vertical reciprocating movement, an upwardly opening fork on the upper end of the piston, means to selectively move the piston upwardly to straddle the fork over the pin and bring the piston into engagement with the pin and thereby lift the roof with the continued upward movement of the piston, or to move the piston downwardly to lower the fork clear of the pin, and means interposed between the piston and the roof effective to maintain the roof in a plane substantially at right angles to the axis of the piston during the lifting and lowering movements of the roof.

4. A combination as in claim 3 including adjustable set screws mounted on the brackets and engageable with the pin to limit the upward movement of said pin in the slots.

5. A combination as in claim 3 wherein said last named means comprises substantially vertical shoulders on the brackets below the fork and pin connections, a collar fixed to the piston at a point adjacent said shoulders, laterally projecting flanges on the collar, and adjustable set screws turnable in the flanges and engageable with the shoulders.

6. The combination with a furnace shell of a roof removably seated on the shell, a vertically disposed piston separate from the roof journaled adjacent the shell for reciprocating and turning movement relative to the latter, separate normally disengaged elements on the roof and on the piston, respectively, means for selectively operating the piston to bring the engagement element thereon into engagement with the engagement means on the roof whereby to lift the roof, an electrode rod holding and operating assembly supported on the piston and turnable therewith, the electrode holding arms of such assembly normally overhanging the roof.

7. The combination with a furnace shell, of a roof removably seated on the shell, vertically disposed bearings fixed to the shell, a piston separate from the roof and mounted in said bearings for both vertical and rotative movement therein, means to vertically move the piston into engagement with the roof to lift the same, means operative during such vertical movement of the shaft to rotate the same and swing the roof clear of the shell, an electrode rod holding and operating assembly separate from the roof and unattached thereto, said assembly being fixed to and movable vertically and rotatably with the piston, the piston when in one position being rotatable independently of its vertical movement whereby the electrode assembly may be turned clear of the roof without lifting the roof.

8. The combination with a furnace shell, of a roof removably seated on the shell, vertically disposed bearings fixed to the shell, a piston separate from the roof and mounted in said bearings for both vertical and rotative movement therein, means to vertically reciprocate said piston in said bearings, a helical slot formed in one of said bearings, a lug on the piston operable to ride through the slot during a portion of its upward movement through the bearings whereby the piston will be simultaneously rotated in the bearings as it so moves vertically, normally disengaged but interlockable engagement means on the piston and roof, respectively, such means coming into engagement upon said movement of the piston whereby to raise the roof and swing it away from the shell, the lug on the piston being so positioned thereon that when the piston is in its lowered position the lug will be clear of the adjacent bearing whereby the piston may be rotated independently of its vertical movement, an electrode rod holding and operating assembly separate from the roof and unattached thereto, said assembly being fixed to the piston and being movable therewith through both its vertical and rotative movements.

EDOUARD THYS.

REFERENCES CITED

The following references are of record in the file of this patent:

UNITED STATES PATENTS

| Number | Name | Date |
| --- | --- | --- |
| 1,658,071 | Bernard | Feb. 7, 1928 |
| 1,818,239 | Moore | Aug. 11, 1931 |
| 2,046,085 | Moore | June 30, 1936 |
| 2,114,230 | Moore | Apr. 12, 1938 |
| 2,261,587 | Moore | Nov. 4, 1941 |
| 2,290,029 | Brooke | July 14, 1942 |
| 2,396,663 | Kuelthau | Mar. 19, 1946 |